(12) United States Patent
Mizutani

(10) Patent No.: US 8,167,015 B2
(45) Date of Patent: *May 1, 2012

(54) METHOD OF MANUFACTURING PNEUMATIC TIRE AND MANUFACTURING PNEUMATIC TIRE

(75) Inventor: Tamotsu Mizutani, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 648 days.

This patent is subject to a terminal disclaimer.

(21) Appl. No.: 12/273,637

(22) Filed: Nov. 19, 2008

(65) Prior Publication Data

US 2009/0133791 A1   May 28, 2009

(30) Foreign Application Priority Data

Nov. 26, 2007   (JP) .................................. 2007-304537

(51) Int. Cl.
*B60C 19/08* (2006.01)
(52) U.S. Cl. ..................... 152/152.1; 156/117; 156/130; 152/209.5; 152/DIG. 2
(58) Field of Classification Search ............... 156/117, 156/130; 152/152.1, 209.5, DIG. 2
See application file for complete search history.

(56) References Cited

U.S. PATENT DOCUMENTS

| | | |
|---|---|---|
| 2,339,546 A | 1/1944 | Hanson |
| 5,518,055 A | 5/1996 | Teeple et al. |
| 5,942,069 A * | 8/1999 | Gerresheim et al. ........ 156/128.1 |
| 6,289,958 B1 * | 9/2001 | Dheur et al. ................ 152/152.1 |
| 6,367,525 B1 * | 4/2002 | Hiruma et al. .............. 152/152.1 |
| 6,415,833 B1 | 7/2002 | Komatsu |
| 2007/0000585 A1 | 1/2007 | Uchida et al. |
| 2007/0163690 A1 | 7/2007 | Nobuchika et al. |

FOREIGN PATENT DOCUMENTS

| | | |
|---|---|---|
| EP | 0 853 010 | 7/1998 |
| JP | 10-081110 | 3/1998 |
| JP | 10-203114 | 8/1998 |
| JP | 11-078417 | 3/1999 |
| JP | 11-217011 | 8/1999 |
| JP | 2000-190709 | * 7/2000 |
| JP | 2007-008269 | 1/2007 |
| JP | 2007-176437 | 7/2007 |

* cited by examiner

*Primary Examiner* — Khanh P Nguyen
*Assistant Examiner* — John Blades
(74) *Attorney, Agent, or Firm* — Fish & Richardson P.C.

(57) ABSTRACT

A pneumatic tire includes a non-conductive tread surface and has an electrically conductive rubber in a wave-like or other configuration arranged in a tire circumferential direction. The tire has an electrically conductive sidewall rubber. Upper portions of the wave-like conductive rubber configuration are on the tread surface, while lower portions of the wave-like rubber configuration contact the electrically conductive sidewall rubber. As the tread surface and the electrically conductive rubber on the tread surface are worn away through use, the diametrically outermost portion of the electrically conductive sidewall rubber of the tire comes into contact with the ground and maintains an effective electrically conductive path.

9 Claims, 4 Drawing Sheets

(a)

(b)

(c)

(d)

(e)

METHOD OF MANUFACTURING PNEUMATIC TIRE AND MANUFACTURING PNEUMATIC TIRE

BACKGROUND OF THE INVENTION

1. Field of the Invention

The present invention relates to a method of manufacturing a pneumatic tire taken measures concerning electric resistance problem by forming an electrically conductive layer on a tread surface and forming an electrically conductive sidewall rubber. The present invention also relates to the pneumatic tire.

2. Description of the Related Art

Conventionally, there are known pneumatic tires that include a tread rubber blended with silica at a high ratio to reduce rolling resistance, which has a close relationship with fuel consumption efficiency of vehicles, as well as to increase braking performance on wet road surface (wet braking performance). However, such tread rubber has the following disadvantage. That is, compared to a tread rubber blended with carbon black at a high ratio, the tread rubber blended with silica has a higher electrical resistance. Therefore, electrostatic generated on vehicle body and/or tires is prevented from being released therefrom, thereby causing a problem such as radio noise. In order to solve this problem, the following pneumatic tires have been developed. That is, an electrically non-conductive tread rubber blended with silica and the like is provided with an electrically conductive layer blended with carbon black at a high ratio to eliminate the electric resistance problem.

For example, U.S. Pat. No. 5,518,055, Japanese Unexamined Patent Publication (Kokai) No. 10-81110, Japanese Unexamined Patent Publication (Kokai) No. 10-203114, and Japanese Unexamined Patent Publication (Kokai) No. 2007-8269 describe the following pneumatic tires. That is, an outer peripheral surface of an electrically non-conductive tread rubber located in an edge area thereof is covered with an electrically conductive layer, and the electrically conductive layer is disposed on a boundary between a tread rubber and a wing rubber or a sidewall rubber. An edge portion of the electrically conductive layer is arranged to be in contact with a rim or an electrically conductive rubber portion, which is electrically conductive from the rim (for example, wing rubber or sidewall rubber); thereby the electrostatic generated on a vehicle body and/or tires is released to the road surface.

However, in these tires, the electrically conductive layer is widely exposed to the outer peripheral surface in an edge area of tread rubber. Therefore, these tires have the following problem. That is, when the tread rubber wears to a certain extent, the electrical conductivity performance hardly functions and the electrical conductivity performance is not maintained satisfactorily. Moreover, since the electrically conductive layer is formed in a sheet-like configuration, the volume of the electrically conductive layer becomes excessively large. Moreover, since the electrically conductive layer is continuously exposed on the tread surface, improvement effect obtained by using the electrically non-conductive tread rubber is not exerted satisfactorily. That is, improvement effect of fuel efficiency performance and wet braking performance, obtained by the tread rubber blended with silica at high ratio, cannot be achieved satisfactorily.

U.S. Pat. No. 2,339,546 describes a pneumatic tire in which an electrically conductive layer extends along a carcass layer, one end of which is exposed to a tread surface through an inside of a tread rubber and the other end thereof is in contact with a rim. The electrically conductive layer has a sheet-like configuration continuously extends in a circumferential direction of the tire. As a result, the volume of the electrically conductive layer is excessively large as described above, and the electrically conductive layer is continuously exposed to the tread surface. In such a case, improvement effect of the electrically non-conductive tread rubber used may not be obtained satisfactorily. Japanese Unexamined Patent Publication (Kokai) No. 2007-176437 describes a pneumatic tire, an electrically conductive layer of which extends spirally toward the tread surface from a rim strip rubber (clinch rubber). In this case, an electrically conductive path is excessively long.

Further, Japanese Unexamined Patent Publication (Kokai) No. 11-217011 and Japanese Unexamined Patent Publication (Kokai) No. 11-78417 describe the following pneumatic tires. That is, the pneumatic tires includes an electrically non-conductive tread rubber and a shoulder rubber joined with a sidewall rubber or an extended sidewall rubber, which covers a surface of a shoulder portion, an end portion of which extends up to a ground contact end region of the tread rubber. The sidewall rubber and the shoulder rubber are formed of an electrically conductive rubber, and the end portion of the sidewall rubber is in contact with a rim.

However, generally, sidewall rubbers are poor in wear resistance. Therefore, it is not desirable to allow the sidewall rubber to come in contact with road surface in initial stage of wear. Further, in these tires, the sidewall rubber blended with carbon black at a high ratio is widely exposed to an outer peripheral surface in an end area of the tread rubber. An Effect, that is obtained by using a tread rubber blended with silica at a high ratio; i.e., an effect to improve fuel saving performance and wet braking performance may not be obtained satisfactorily.

SUMMARY OF THE INVENTION

The present invention has been proposed in view of the above circumstances. An object of the present invention is to provide a manufacturing method of a pneumatic tire capable of appropriately maintaining electrical conductivity performance and satisfactorily exerts improvement effect obtained by using a tread rubber blended with silica at a high ratio, and to provide such a pneumatic tire.

The above-mentioned object can be achieved by the present invention as follows. That is, the present invention provides a method of manufacturing a pneumatic tire, comprising steps of: a tread forming step forming an electrically non-conductive tread rubber; and a sidewall forming step forming an electrically conductive sidewall rubber, wherein the tread forming step includes: a first step forming an electrically non-conductive tread rubber that constitutes an outer periphery portion of the tread; and a second step forming, on the tread surface, an electrically conductive layer that extends along a circumferential direction of the tire while alternately passing through a first position that is located on the tread surface at the inner side than a ground contact end as viewed in a width direction of the tire and a second position that is located at an outer side than the ground contact end as viewed in the width direction of the tire and is in contact with the sidewall rubber, and the sidewall forming step includes a step to dispose an outer end of the sidewall rubber as viewed in a tire-diameter direction, on an imaginary extension line or at a point that is outer than the imaginary extension line as viewed in a tire-diameter direction, said imaginary extension line extending outwardly from a point of 15% depth of wear limit depth in a shoulder portion along the tread surface in a width direction of the tire, as well as at a point that is located at an outer side than the ground contact end as viewed in a width direction of the tire.

In the method of manufacturing pneumatic tires according to the present invention, in the tread forming step, first of all, an electrically non-conductive tread rubber that constitutes an outer periphery portion of the tread is formed. In the electrically non-conductive tread rubber, at least the outer periphery portion of the tread has to be formed of an electrically non-conductive rubber. Therefore, when the tread rubber has a double-layered structure of a cap rubber and a base rubber, the cap rubber built-up on an outer periphery of the base rubber is formed of an electrically non-conductive rubber.

Subsequently, an electrically conductive layer that extends along the circumferential direction of the tire is formed on the tread surface while changing the position in a width direction of the tire so as to alternately pass through a first position and a second position. The first position is positioned on the tread surface located inner side than a ground contact end as viewed in the width direction of the tire. The second position is located outer than the ground contact end as viewed in the width direction of the tire capable of being in contact with the sidewall rubber. Here, the innermost position of the first position as viewed in the width direction of the tire is not particularly limited. However, the first position is preferably arranged to be outer than a main groove located at the outermost as viewed in the width direction of the tire, which is formed in the tread portion after the tire is subjected to vulcanized processing, because an electrically conductive path is not separated by the main groove.

Herein, the wording "ground contact end" mentioned above means an outermost position, as viewed in the width direction of the tire, coming into contact with a plane road surface when a new tire after vulcanization processing assembled on a normal rim and filled with air at normal inner pressure is placed on the plane surface perpendicular thereto and applied with a normal load. The wording "normal load" means the maximum load specified in JIS D 4202 (elements of vehicle tire) or the like (in the case of tires for passenger car, design normal load). The wording "normal inner pressure" means an air pressure appropriate for the normal load. The wording "normal rim" basically means a standard rim specified by JIS D 4202 or the like.

After forming the electrically conductive layer, the outer end of the sidewall rubber as viewed in a tire-diameter direction is disposed on an imaginary extension line or at a point that is outer than the imaginary extension line as viewed in a tire-diameter direction, the imaginary extension line extending outwardly from a point of 15% depth of wear limit depth in a shoulder portion along the tread surface in a width direction of the tire. And also the outer end of the sidewall rubber as viewed in a tire-diameter direction is disposed at a point that is located at an outer side than the ground contact end as viewed in a width direction of the tire. Alternatively, after disposing the outer end of the sidewall rubber as viewed in the tire-diameter direction on an imaginary extension line or at a point that is outer than the imaginary extension line as viewed in a tire-diameter direction, the imaginary extension line extending outwardly from a point of 15% depth of wear limit depth in a shoulder portion along the tread surface in a width direction of the tire, as well as at a point that is located at an outer side than the ground contact end as viewed in a width direction of the tire, the electrically conductive layer may be disposed so that the outer end portion thereof as viewed in the width direction of the tire is built-up on the outer peripheral surface in the end area of the sidewall rubber.

The wording "a point of 15% depth of wear limit depth in the shoulder portion" means a point of 15% depth from the tread surface to the upper face of an indicator indicating a position of slip sign formed within a main groove located outermost as viewed in the width direction of the tire when a new tire after vulcanization processing, which is assembled on a normal rim and filled with air at a normal inner pressure, is placed on a plane surface perpendicular thereto.

According to the present invention, a linear electrically conductive path is formed on the tread surface. Therefore, the volume of the electrically conductive layer can be significantly reduced while maintaining the electrical conductivity performance. As a result, an improvement effect obtained by using the electrically non-conductive tread rubber; i.e., improvement effect of fuel saving performance and wet braking performance obtained by the tread rubber blended with silica at a high ratio can be satisfactorily achieved.

When the tread rubber has been worn to an extent that the linear electrically conductive path formed on the tread surface is eliminated: i.e., the shoulder portion has been worn to a point of 15% depth of wear limit depth, the outer end of the sidewall rubber as viewed in the tire-diameter direction comes into contact with the road surface. With this arrangement, even when the shoulder portion on the tread rubber has been worn to a point of 15% depth of wear limit depth, electric charge can be released to the road surface from the end portion of the electrically conductive sidewall rubber therethrough. As a result, the electrical conductivity performance of the tread rubber can be ensured via electrically conductive layer during the initial stage of wear, and via sidewall rubber in the final stage of wear.

To satisfactorily achieve the improvement effect of the fuel saving performance and the wet braking performance by using the tread rubber blended with silica at a high ratio, the electrically conductive layer extending on the tread surface is preferably formed only on one side of the tire.

In the present invention, the electrically conductive layer may be formed of an electrically conductive liquid material such as gum, rubber cement and the like. However, it is preferred to form the electrically conductive layer by winding a strip of electrically conductive rubber in the second step. In this case, compared to the electrically conductive layer formed of an electrically conductive liquid material, the thickness of the electrically conductive layer can be ensured more effectively. Therefore the electrically conductive layer can be prevented from being eliminated and the electrical conductivity performance can be maintained more reliably. With this arrangement, the improvement effect of the fuel saving performance and the wet braking performance obtained by using the tread rubber blended with silica at a high ratio can be achieved more effectively, and the electrical conductivity performance can be ensured from the initial stage of wear to the final stage of wear of the tread rubber. The minimum value of thickness and width in cross-section of the rubber string is preferably 1.2 to 1.7 mm because the outer end of the sidewall rubber as viewed in the tire-diameter direction can be reliably come into contact with the road surface before the wear of the tread rubber progresses and the electrically conductive path of the rubber string is eliminated.

Moreover, the present invention provides a pneumatic tire, comprising: an electrically non-conductive tread rubber that constitutes an outer periphery portion of a tread; an electrically conductive layer that extends along a circumferential direction of the tire while alternately passing through a first position that is located on the tread surface at inner side than a ground contact end as viewed in a width direction of the tire, and a second position that is located at outer side than the ground contact end as viewed in the width direction of the tire and is in contact with the sidewall rubber; and a sidewall rubber having an outer end as viewed in a tire-diameter direction, said outer end thereof disposed on an imaginary extension line or at a point that is outer than the imaginary extension line as viewed in a tire-diameter direction, said imaginary extension line extending outwardly from a point of 15% depth of wear limit depth in a shoulder portion along the tread surface in a width direction of the tire, as well as at a point that is located at an outer side than the ground contact end as viewed in a width direction of the tire.

In the pneumatic tire according to the present invention, the electrically conductive layer and the sidewall rubber form the electrically conductive path continuous from the tread surface at the shoulder portion to the rim as described above. With this arrangement, the electrostatic generated on the vehicle body and/or tire can be released to the road surface, and thus a problem such as radio noise can be prevented.

Also, the linear electrically conductive path that is continuous from the tread surface at the shoulder portion to the sidewall rubber is formed. The volume of the electrically conductive layer can be significantly reduced while maintaining the electrical conductivity performance, but the electrically conductive layer is not continuously exposed to the tread surface. As a result, the improvement effect obtained by using the electrically non-conductive tread rubber; i.e., the improvement effect of the fuel saving performance and the wet braking performance obtained by using the tread rubber blended with silica at a high ratio can be satisfactorily achieved.

Moreover, when the shoulder portion has been worn to a point of 15% depth of wear limit depth, the outer end of the sidewall rubber as viewed in the tire-diameter direction comes into contact with the road surface. With this arrangement, even when the shoulder portion has been worn to a point of 15% depth of wear limit depth, the electrostatic can be released to the road surface from the end portion thereof via the electrically conductive sidewall rubber. Therefore, the electrical conductivity performance can be ensured from the initial stage of wear to the final stage of wear of the tread rubber.

In the above-described pneumatic tire, when the electrically conductive layer is constituted of a strip of electrically conductive rubber, compared to the electrically conductive layer formed of electrically conductive liquid material, the thickness of the electrically conductive layer is ensured. Therefore, the electrically conductive layer can be prevented from eliminating; and thus the electrical conductivity performance can be maintained more reliably. With this arrangement, the improvement effect of the fuel saving performance and the wet braking performance obtained by using the tread rubber blended with silica at a high ratio can be achieved more effectively and the electrical conductivity performance can be ensured from the initial stage of wear to the final stage of wear of the tread rubber.

DETAILED DESCRIPTION OF THE PREFERRED EMBODIMENTS

Figure 1:
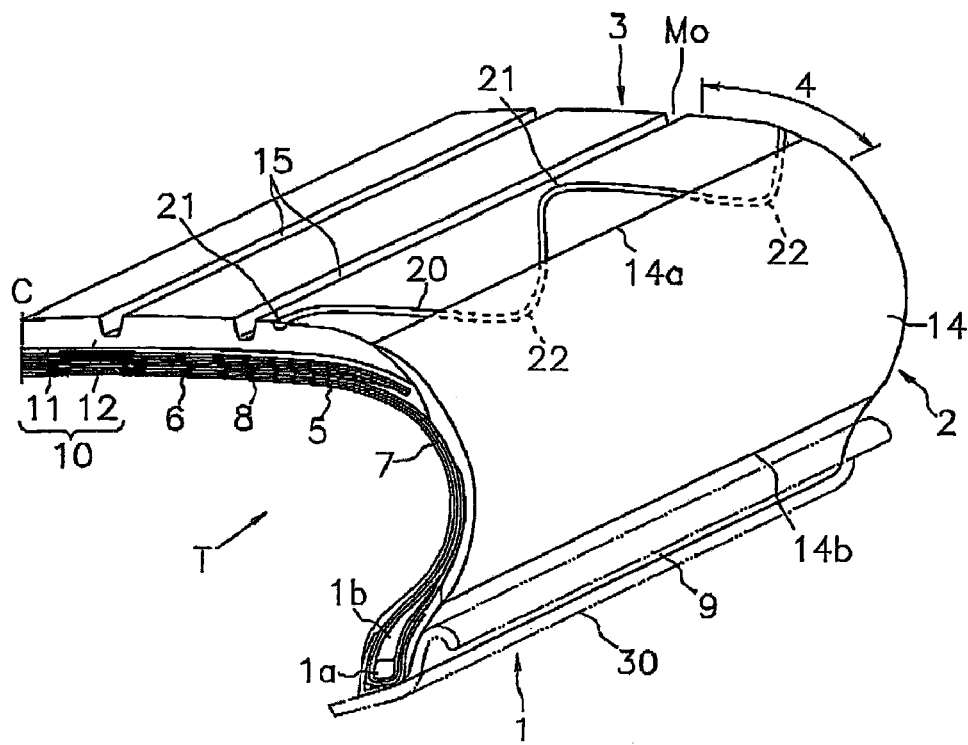
FIG. 1 is a perspective cross-sectional view illustrating an example of a pneumatic tire according to the present invention.

Referring to the accompanying drawings, preferred embodiments of the present invention will be described below. FIG. 1 is a perspective cross-sectional view illustrating an example of a pneumatic tire according to the present invention.

A pneumatic tire T includes a pair of bead portions 1, a pair of sidewall portions 2 each extending outward in a tire-diameter direction from the bead portion 1, and a tread portion 3 located at the outer end of the tire, which extends in the tire-diameter direction continuously with the respective sidewall portions 2 being interposed by a shoulder portion (tread shoulder) 4. The bead portion 1 includes a circular bead 1a composed of a bundle of steel wires or the like covered with rubber, and a bead filler 1b formed of hard rubber.

A carcass layer 7 is composed of at least a sheet of carcass ply (in this embodiment: two sheets) and is disposed being bridged between the pair of bead portions 1. The carcass ply is formed of cords covered with rubber extending at an angle of roughly 90° with respect to the equator line C of the tire. The end portion of the carcass ply is wound up and fixed being interposed by the bead 1a. The carcass layer 7 includes an inner liner rubber 5 provided on the inner periphery thereof for maintaining air pressure.

The carcass layer 7 is provided with a belt layer 6 composed of two layers of belt ply on the outer periphery of the tread portion 3 to reinforce the carcass layer 7 with a hoop effect. Each layer of the belt ply includes steel cords each extending with an inclination at an angle of approximately 25° with respect to the equator line C of the tire so that the steel cords of the two layers are built-up crossing each other in opposite directions. Also, the belt layer 6 is provided with a belt reinforcement layer 8 on the outer periphery thereof.

The carcass layer 7 is provided with a piece of rim strip rubber 9 that comes into contact with a rim 30 on the outer periphery of the bead portion 1. Also, the carcass layer 7 is provided with a piece of sidewall rubber 14 on the outer periphery of the sidewall portion 2. According to the embodiment, each of the carcass ply, the rim strip rubber 9 and the sidewall rubber 14 is formed of electrically conductive rubber in which raw rubber is mixed with carbon black as a reinforcement agent at a high ratio.

In the tread portion 3, a piece of electrically non-conductive tread rubber 10 is disposed at the outer side of the belt layer 6 and the belt reinforcement layer 8 in the tire-diameter direction on the outer periphery of the carcass layer 7. The tread rubber 10 according to the embodiment has a double-layered structure that includes a piece of base rubber 11 and a piece of cap rubber 12. The piece of cap rubber 12 is built-up on the outer periphery of the base rubber 11 and constitutes an outer periphery portion of the tire in the tread portion 3. As viewed in the tire-diameter direction, the outer end of the sidewall rubber 14 is built-up on the tread rubber 10 on the outer peripheral surface of the end portion thereof; i.e., so-called a side-on-tread structure is employed.

The cap rubber 12 is formed of an electrically non-conductive rubber in which raw rubber is mixed with silica as a reinforcement agent at a high ratio. With this arrangement, superior fuel saving performance and wet braking performance can be obtained. According to the present invention, although the base rubber 11 may be formed of the electrically conductive rubber, the base rubber 11 may be formed of an electrically non-conductive rubber. In this case, both of the base rubber 11 and the cap rubber 12 can be formed of rubber containing silica at a high ratio. As a result, the tire rolling resistance can be reduced effectively and the fuel saving performance can be satisfactorily increased.

Here, as the electrically conductive rubber, a rubber having volume resistivity of $10^8$ Ω·cm or less is exemplified. The electrically conductive rubber can be obtained by mixing a predetermined amount of an electrical conductivity-imparting agent. As a carbon conductivity-imparting agent, in addition to carbon black, carbon fiber, graphite or the like are available. As a metal conductivity imparting agent, metal powder, metal oxide, metal flake, metal fiber or the like are available. As the electrically non-conductive rubber, electrically non-conductive rubber having the volume resistivity of $10^8$ Ω·cm or more is exemplified.

As raw rubber for the electrically conductive rubber and the electrically non-conductive rubber, natural rubber, styrene butadiene rubber (SBR), butadiene rubber (BR), isoprene rubber (IR), butyl rubber (IIR) and the like are available. Single or two or more kinds of the above materials may be used by mixture. The raw rubber is appropriately mixed with a vulcanizing agent, a vulcanization accelerator, an elasticizer, an antioxidant or the like.

The tread is formed with various tread patterns including groove portions and land portions are formed on the surface thereof. FIG. 1 illustrates main grooves 15 only, which extend in the circumferential direction of the tire. As the groove portions, in addition to the main grooves 15, transverse grooves and inclination grooves extending crossing the main grooves 15 and sub grooves, which are shallower than the main grooves 15, may be appropriately formed. Reference numeral 14a denotes the outer end of the sidewall rubber 14, and reference numeral 14b denotes the inner end of the sidewall rubber 14 as viewed in the tire-diameter direction.

Figure 2:
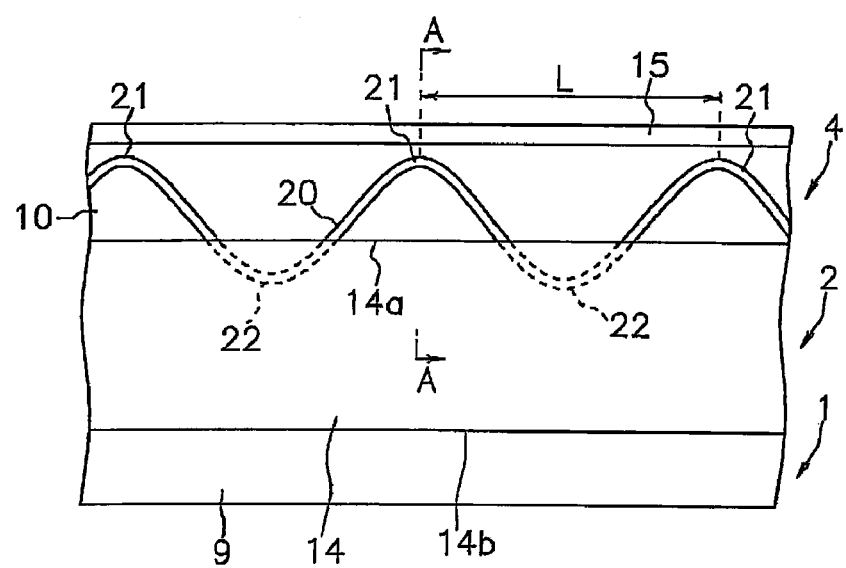
FIG. 2 is an extension view illustrating an outer surface of the tire from a bead portion to a shoulder portion.
Figure 3:
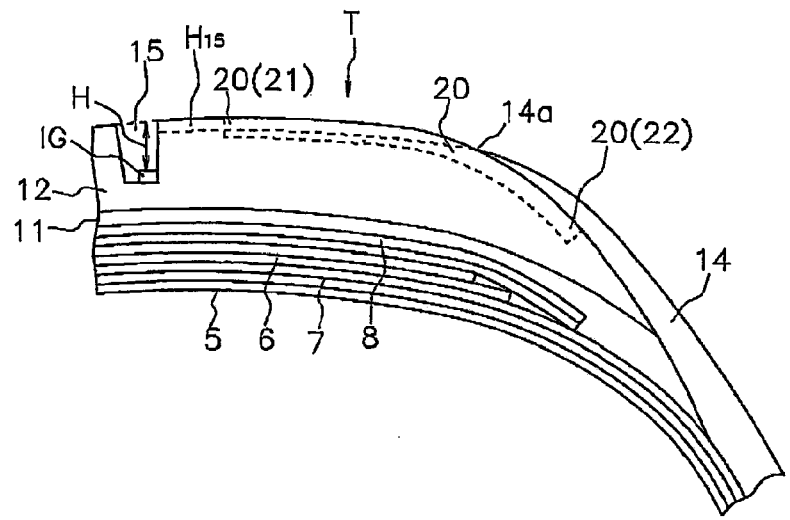
FIG. 3 is a cross-sectional view along arrows A-A in FIG. 2.

FIG. 2 is an extension view illustrating an outer surface of the tire from the bead portion 1 to the shoulder portion 4 of the pneumatic tire T. FIG. 3 is a cross-sectional view along arrows A-A in FIG. 2.

As illustrated in FIGS. 1 to 3, the pneumatic tire T includes an electrically conductive layer 20 that extends along the circumferential direction of the tire. The electrically conductive layer 20 extends alternately passing through first positions 21 and second positions 22. The first positions 21 are located on the tread surface at the inner side than a ground contact end as viewed in the width direction of the tire. The second positions 22 are located at the outer side than the ground contact end being in contact with the sidewall rubber 14 as viewed in the width direction of the tire. The electrically conductive layer 20 winds its way while changing its position in the width direction of the tire. The electrically conductive layer 20 extends on the surface of the tread rubber 10 alternately from the first positions 21 to the second positions 22.

The electrically conductive layer 20 forms an electrically conductive path that extends from the tread surface of the shoulder portion 4 to the sidewall rubber 14. Electrostatic generated on a vehicle body flows from the rim 30 to a road surface through the rim strip rubber 9, the sidewall rubber 14 and the electrically conductive layer 20 and is released therefrom. With this arrangement, problems such as radio noise are prevented from occurring.

Moreover, since the electrically conductive layer 20 is formed in a strip, the volume of the electrically conductive layer 20 can be significantly reduced while ensuring the electrical conductivity performance thereof. As a result, an improvement effect, which is obtained by employing the electrically non-conductive tread rubber 10, is ensured. That is, improvement effect of the fuel saving performance and the wet braking performance obtained by the tread rubber 10 mixed with silica at a high ratio can be satisfactorily achieved.

The electrically conductive layer 20 according to the present embodiment is formed of a strip of electrically conductive rubber 25. The strip of electrically conductive rubber 25 is formed of electrically conductive raw rubber extruded with an extruder or the like. Therefore, compared to a thin film-like electrically conductive layer formed of gum or rubber cement, the thickness of the electrically conductive layer 20 is ensured. Thus, the electrically conductive layer 20 is prevented from being breached or broken; and thus the electrical conductivity performance thereof can be maintained more reliably.

To obtain the fuel saving performance and the wet braking performance with the tread rubber 10 mixed with silica at a high ratio, the electrically conductive layer 20 extending on the tread surface is preferably formed at one side only of the tire. Further, the electrically conductive layer 20 is preferably formed in a ring-like shape entirely along the circumferential direction of the entire tire. With this arrangement, the contact frequency between the electrically conductive layer 20 and the road surface is increased, so that the electrical conductivity performance is satisfactorily ensured.

If required electrical conductivity performance is appropriately obtained, the length "L" that is one cycle of the electrically conductive layer 20 (length between the adjacent first positions 21 in circumferential direction of the tire) is not particularly limited. However, L/2 is preferably equal to or less than a contact length in the shoulder portion 4. With this arrangement, the electrically conductive layer 20 comes into contact with the road surface at least at one point within the ground contact surface. The contact frequency between the electrically conductive layer 20 and the road surface can be ensured, and thus satisfactory electrical conductivity performance can be obtained.

As shown in FIG. 3, the pneumatic tire T includes the sidewall rubber 14. The outer end 14a of the sidewall rubber 14 as viewed in the tire-diameter direction is disposed on an imaginary extension line $H_{15}$ extending outwardly from a point of 15% depth of wear limit depth in a shoulder portion along the tread surface as viewed in the width direction of the tire. Alternatively, the outer end 14a of the sidewall rubber 14 is disposed at a point that is outer side than the imaginary extension line $H_{15}$ as viewed in the tire-diameter direction. And also the outer end 14a of the sidewall rubber 14 is disposed at a point that is located at an outer side than the ground contact end as viewed in a width direction of the tire. According to the present embodiment, the outer end 14a of the sidewall rubber 14 as viewed in the tire-diameter direction is disposed on a point that is on the imaginary extension line $H_{15}$ as well as outer side than the ground contact end as viewed in the width direction of the tire. Here, the wording "a point 15% depth of wear limit depth in the shoulder portion" means a point of 15% depth of a depth "H" from the tread surface to a point of upper face of an indicator IG that indicates a point of slip sign formed inside the main groove 15 located at the outermost as viewed in the width direction of the tire.

With the outer end 14a of the sidewall rubber 14 as viewed in the tire-diameter direction, which is dispose at the above-described point, during a stage that the tread rubber 10 is not worn yet, the sidewall rubber 14 does not come into contact with the road surface. However, when the shoulder portion of the tread rubber 10 has worn up to a point of 15% depth of wear limit depth in a shoulder portion, the outer end 14a of the sidewall rubber 14 as viewed in the tire-diameter direction comes into contact with the road surface. As a result, the electrical conductivity performance of the tread rubber can be ensured from the initial stage to the final stage of wear.

As described above, the pneumatic tire according to the present invention includes the electrically non-conductive tread rubber and the electrically conductive layer. Excepting the above points, the pneumatic tire according to the present invention is the same as ordinary pneumatic tires. Therefore, any of conventionally known materials, configurations, structures and the like may be applied to the present invention.

Next, a method of manufacturing the pneumatic tire T will be described below with reference to FIGS. 4 to 7. The manufacturing method of the pneumatic tire according to the present invention may be the same as the ordinary manufacturing method of tires excepting the following two points; i.e., a tread forming step to form the electrically non-conductive tread rubber 10 and a sidewall forming step to form the electrically conductive sidewall rubber 14.

The present embodiment gives an example in which the tread rubber 10, the sidewall rubber 14 and the rim strip rubber 9 are formed on a partial tire PT; and thus an unvulcanized green tire is formed. The partial tire PT includes a pair of bead portions 1 and a carcass layer 7 disposed therebetween. The carcass layer 7 is provided with an inner liner rubber 5 disposed at an inner periphery thereof. The partial tire PT is supported rotatably in the circumferential direction of the tire by a rotatable support such as a tire forming drum and rigid core (see FIG. 5).

The tread forming step includes a first step and a second step. That is, in the first step, the electrically non-conductive tread rubber 10, which constitutes an outer portion of the periphery of the tread. And in the second step, the electrically conductive layer 20 is formed along the circumferential direction of the tire. These steps will be described below in detail.

Figure 4:
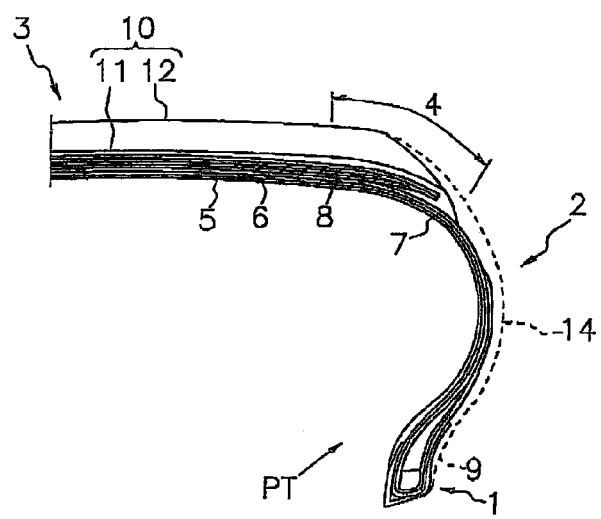
FIG. 4 is a cross-sectional view for explaining manufacturing method of a pneumatic tire of the present invention.

First of all, in the first step, the tread rubber 10 is formed on the partial tire PT, on which the belt layer 6 and the belt reinforcement layer 8 are previously formed as shown in FIG. 4. In FIG. 4, a broken line indicates an outline of sectional shape of the finished rim strip rubber 9 and sidewall rubber 14.

Figure 5:
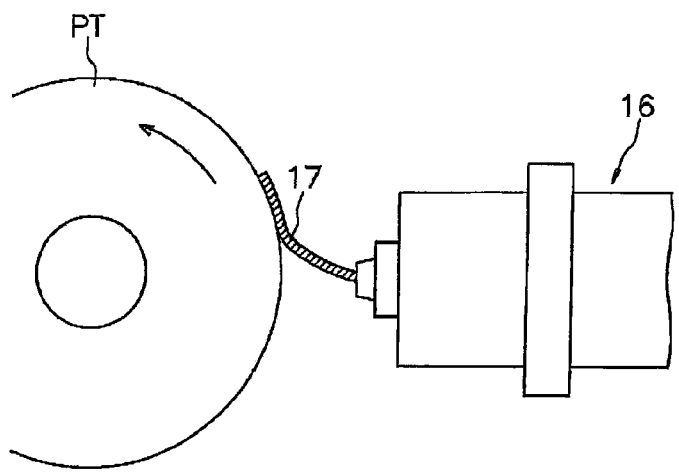
FIG. 5 is an explanatory view schematically illustrating a rubber ribbon winding operation on a partial tire.

As shown in FIG. 5, the tread rubber 10 is formed by winding a rubber ribbon 17, supplied from a rubber ribbon supply apparatus 16, on the partial tire PT. With this arrangement, cross-sectional shape of the tread rubber 10 can be formed precisely. At least the cap rubber 12 in the tread rubber 10 is formed of electrically non-conductive rubber ribbon as the rubber ribbon 17.

Figure 6:
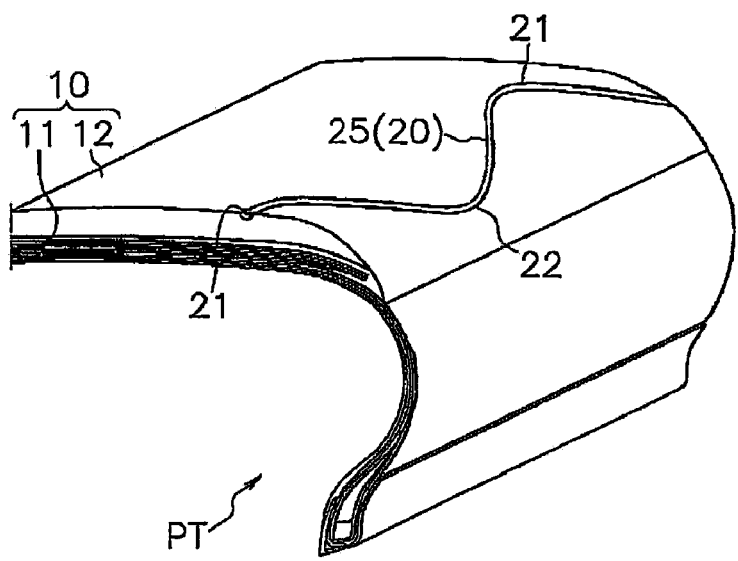
FIG. 6 is a perspective cross-sectional view for explaining a manufacturing method of the pneumatic tire of the present invention.

Next, in the second step, the electrically conductive layer 20 is formed. The electrically conductive layer 20 extends along the circumferential direction of the tire while winding its way as shown in FIG. 6. The electrically conductive layer 20 passes alternately through the first positions 21 and the second positions 22. The first positions 21 are located on the tread surface at the inner side than the ground contact end as viewed in the width direction of the tire. The second positions 22 are located at outer side than the ground contact end as viewed in the width direction of the tire being in contact with the sidewall rubber 14. The second positions 22 are located on the outer peripheral surface of the base rubber 11 in an end area thereof. With this arrangement, the electrically conductive layer 20 is in contact with the sidewall rubber 14 that is formed thereon.

According to the present embodiment, the electrically conductive layer 20 is formed of a string of electrically conductive rubber 25. That is, the rubber string 25 is wound along the circumferential direction of the tire while winding its way. The rubber string 25 passes alternately through the first positions 21, that are located on the tread surface at the inner side than the ground contact end as viewed in the width direction of the tire, and the second positions 22, that are located at the outer side than the ground contact end as viewed in the width direction of the tire being in contact with the sidewall rubber 14. The electrically conductive layer 20 as described above can be easily wound on the partial tire PT by changing the winding position of the rubber string 25 in the width direction of the tire while rotating the partial tire PT.

If the required electrical conductivity performance is appropriately obtained, the size of the rubber string 25 is not particularly limited. Cross-sectional configuration of the rubber string 25 is not particularly limited, but it may have a circular, elliptical, rectangular, triangle or semicircular shape in cross-section. The minimum width and thickness in cross-section of the rubber string 25 is preferably 1.2 to 1.7 mm. With this arrangement, before the electrically conductive path formed of the rubber string 25 is eliminated as the wear of the tread rubber 10 progresses, the outer end 14a of the sidewall rubber 14 as viewed in the tire-diameter direction comes into contact with the road surface more reliably.

Figure 7:
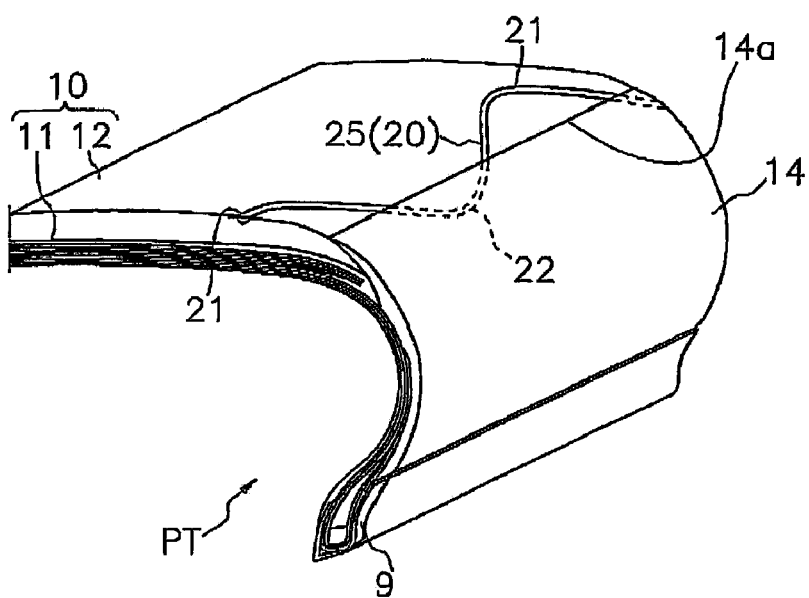
FIG. 7 is a perspective cross-sectional view for explaining the manufacturing method of the pneumatic tire of the present invention.

The sidewall forming step includes the step of disposing the outer end 14a of the sidewall rubber 14 as viewed in the tire-diameter direction on the imaginary extension line or at a point that is positioned outer side than the imaginary extension line as viewed in the tire-diameter direction as well as positioned outer than the ground contact end as viewed in the tire-width direction as shown in FIG. 7. The imaginary extension line extends outward along the tread surface from a point of 15% depth of the wear limit depth in the shoulder portion as viewed in the tire width direction.

After forming the finished sectional shape of the rim strip rubber 9, the tire is subjected to a vulcanization processing; thus the pneumatic tire shown in FIG. 1 is completed. The rim strip rubber 9 and the sidewall rubber 14 can be formed by applying a circular rubber extrusion having a predetermined shape in cross-section; or by winding an electrically conductive rubber ribbon using an apparatus as shown in FIG. 5.

Each of the tread rubber 10, the rim strip rubber 9 and the sidewall rubber 14 can be formed precisely in finished sectional shape by winding a rubber ribbon in the same manner as the first step. The wording "finished sectional shape of the tread rubber 10 and the like" means here the sectional shape required for the green tire before the tire is subjected to the vulcanization processing. Therefore, the sectional shape may not agree with the sectional shape shown in FIG. 1.

Other Embodiments (1) The above-described embodiment describes an example in which the tread rubber has a double-layered structure constituted of the cap rubber and the base rubber. However, the present invention is not limited thereto. The tread rubber may be formed of an electrically non-conductive rubber in single layer. Also, the tread rubber is not limited to the tread rubber, which is formed by wounding a rubber ribbon. The tread rubber may be formed by applying a rubber extruded in a circular shape.

Figure 8:
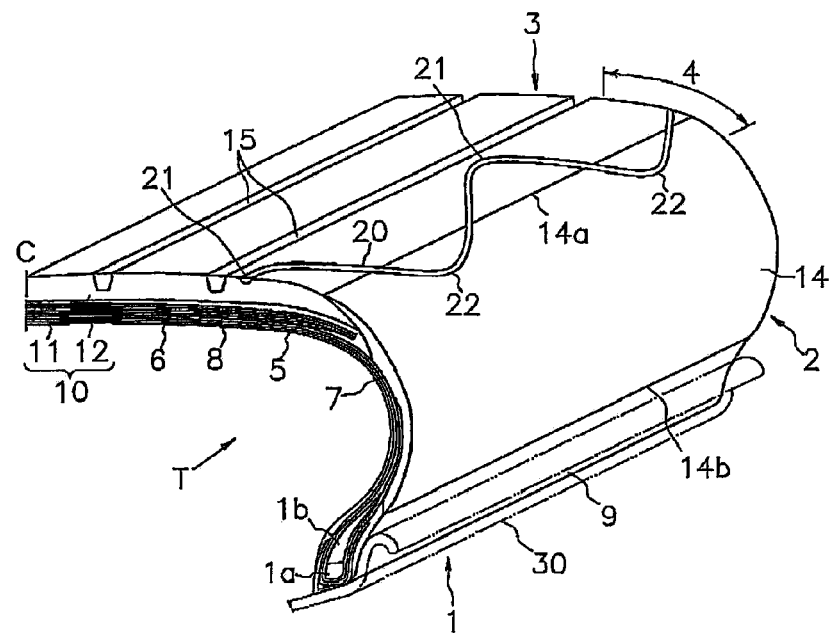
FIG. 8 is a perspective cross-sectional view illustrating an example of a pneumatic tire according to another embodiment of the present invention.

(2) The above embodiment describes an example in which the sidewall rubber is formed after the electrically conductive layer is formed. However, as shown in FIG. 8, the outer end 14a of the sidewall rubber 14 as viewed in the tire-diameter direction may be disposed first on the imaginary extension line $H_{15}$ extending outwardly from a point of 15% depth of the wear limit depth in the shoulder portion 1 along the tread surface in the width direction of the tire; or, at a position that is located outer side than the imaginary extension line $H_{15}$ as viewed in the tire-diameter direction as well as outer side than the ground contact end as viewed in the width direction of the tire. And after that, the outer end portion of the electrically conductive layer 20 may be built-up on the outer peripheral surface in the end area of the sidewall rubber 14 as viewed in the width direction of the tire. In this case, the second positions 22 of the electrically conductive layer 20 are positioned on the surface of the sidewall rubber 14.

Figure 9:
FIGS. 9A to 9E are schematic views illustrating examples of winding patterns of a rubber string.
Figure 9:
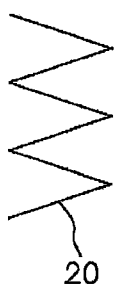
Figure 9:
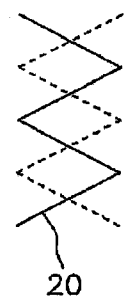
Figure 9:
Figure 9:
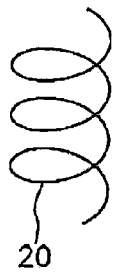

(3) The above embodiment describes an example in which the electrically conductive layer 20 extends while winding its way as shown in FIG. 9A. However, the present invention is not limited thereto. The electrically conductive layer 20 may extend as shown in FIGS. 9B to 9E. FIG. 9B is an example in which the electrically conductive layer 20 extends in a zigzag manner along the circumferential direction of the tire (in a vertical direction in FIG. 9). FIG. 9C is an example in which the example in FIG. 9B is formed twice. FIG. 9D is an example in which the electrically conductive layer 20 extends in a rectangular wave shape. FIG. 9E is an example in which the electrically conductive layer 20 extends spirally. Such electrically conductive layer 20 as described above can be formed by appropriately controlling the position of the rubber string in tire width direction while winding the rubber string and rotation speed and direction of the partial tire PT.

EXAMPLES

Next, examples, which particularly demonstrate constitution and effect of the present invention, will be described below. Performance evaluation of the respective tires were made as described below.

(1) Electrical Conductivity Performance

Tires were mounted on a measuring rim of width specified by ETRTO/JATMA/TRA, and filled with air up to inner pressure of 200 kPa, and a maximum load conforming to the above standards×0.88×0.8 was applied thereto. A voltage (500 V) was applied through an axel supporting the rim to a metal plate that the tire was in contact with; thus electrical resistance values were measured. The measurements were carried out twice on the identical tires respectively; i.e., at a new product stage with no wear; and a 15% wear stage after the main groove has being worn to 15% depth thereof.

(2) Wet Braking Performance

Tires were mounted on an actual vehicle and wet braking performance tests were carried out. On a wet road surface, braking distance of the vehicle from a point traveling at a speed of 100 km/h to a point of stoppage was measured. Defining the braking distance of a comparison 1 as 100, wet braking performance was numerically evaluated. A larger number means a shorter braking distance and is superior in wet braking performance.

(3) Fuel Saving Performance (Rolling Resistance)

Fuel-saving performance tests were made on tires prepared by filling air to inner pressure of 200 kPa on a measuring rim of width specified by ETRTO/JATMA/TRA. Rolling resistance at a traveling speed of 80 km/h was measured. Defining the Fuel saving performance of a comparison 1 as 100, the fuel saving performance was numerically evaluated. A larger number means a smaller rolling resistance and smaller fuel consumption.

Comparative Example 1

Comparative Example 1 was a pneumatic tire (tire size: 225/55R17 101W), the cap rubber of which constituting the tread rubber was formed of the electrically non-conductive rubber and the tread rubber was formed with no electrically conductive layer. The electrically non-conductive rubber was blended with silica of 30% by weight as a reinforcement agent and carbon black of 7% by weight (this was the same for the other examples).

Comparative Example 2

Comparative Example 2 was the same pneumatic tire as Comparative Example 1 excepting the following point. That is, an electrically conductive sidewall rubber, which covered the shoulder portion and the outer end thereof as viewed in the tire-diameter direction extended up to a ground contact end area of the tread, was formed. The electrically conductive rubber, which was blended with silica of 0% by weight as reinforcement agent and carbon black of 31% by weight, was used (this was the same for the other examples).

Examples 1 to 10

Examples were the pneumatic tires that were the same as Comparative Example 1 excepting the following point. That is, electrically conductive layer and electrically conductive sidewall rubber were formed on the tread rubber as the above-described embodiments. The electrically conductive layer was formed using the rubber string of the above-described electrically conductive rubber. Table 1 lists sectional shape, width dimension, thickness dimension, number of contacts with sidewall rubber in the circumferential direction of the tire, and winding manner (see FIG. 9) of the rubber string. Table 2 shows evaluation results with respect to the respective examples.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Rubber string | Sectional shape | Circular | Circular | Circular | Circular | Circular | Circular | Circular | Circular | Circular | Circular |
| | Width (mm) | 1.2 | 1.2 | 1.2 | 1.2 | 1.2 | 1.7 | 1.7 | 1.7 | 1.7 | 1.7 |
| | Thickness (mm) | 1.2 | 1.2 | 1.2 | 1.2 | 1.2 | 1.7 | 1.7 | 1.7 | 1.7 | 1.7 |
| Number of contacts with sidewall rubber | | 35 | 35 | 70 | 35 | 70 | 35 | 35 | 70 | 35 | 70 |
| | Winding pattern | FIG. 9A | FIG. 9B | FIG. 9C | FIG. 9D | FIG. 9E | FIG. 9A | FIG. 9B | FIG. 9C | FIG. 9D | FIG. 9E |

TABLE 2

|  |  | Comparative Example 1 | Comparative Example 2 | Example 1 | Example 2 | Example 3 | Example 4 |
|---|---|---|---|---|---|---|---|
| Electrical resistance ($\Omega$) | New | 1.00E+10 | 5.00E+06 | 1.00E+07 | 1.00E+07 | 7.00E+06 | 1.00E+07 |
|  | At 15% wear | 1.00E+10 | 5.00E+06 | 1.00E+07 | 1.00E+07 | 7.00E+06 | 1.00E+07 |
| Wet braking performance | | 100 | 95 | 100 | 100 | 99.5 | 100 |
| Fuel-saving performance | | 100 | 98 | 100 | 100 | 99.7 | 100 |

|  |  | Example 5 | Example 6 | Example 7 | Example 8 | Example 9 | Example 10 |
|---|---|---|---|---|---|---|---|
| Electrical resistance ($\Omega$) | New | 7.00E+06 | 1.00E+07 | 1.00E+07 | 7.00E+06 | 1.00E+07 | 7.00E+06 |
|  | At 15% wear | 7.00E+06 | 1.00E+07 | 1.00E+07 | 7.00E+06 | 1.00E+07 | 7.00E+06 |
| Wet braking performance | | 99.5 | 100 | 100 | 99 | 100 | 99 |
| Fuel-saving performance | | 99.8 | 100 | 100 | 99.5 | 100 | 99.5 |

As shown in Table 1, Comparative Example 1 fails to obtain electrical conductivity performance effect. In this case, static electricity may be accumulated on the vehicle body causing a problem such as radio noise. Contrarily, in Examples 1 to 10, the electrical conductivity performance was maintained not only at new product stage but also at the stage of 15% wear. Moreover, since the volume of the electrically conductive layer is significantly reduced and the electrically conductive layer is not continuously exposed to the tread surface, the wet braking performance and the fuel saving performance were satisfactorily ensured. On the other hand, in Comparative Example 2, although the electrical conductivity performance effect was obtained from the stage of new product, the wet braking performance and the fuel saving performance at the stage of new product are inferior to those in Examples 1 to 10.

What is claimed is:

1. A method of manufacturing a pneumatic tire, comprising steps of:
  a tread forming step forming an electrically non-conductive tread rubber; and
  a sidewall forming step forming an electrically conductive sidewall rubber,
  wherein the tread forming step includes:
   a first step forming an electrically non-conductive tread rubber that constitutes an outer periphery portion of the tread; and
   a second step forming, on the tread surface, an electrically conductive layer that extends continuously along a circumferential direction of the tire while alternately passing through a plurality of first positions that are located on the tread surface inside of a ground contact end of the tread surface as viewed in a width direction of the tire and a plurality of second positions that are located outside of the ground contact end of the tread surface as viewed in the width direction of the tire, the second positions being in contact with the sidewall rubber, and
  the sidewall forming step includes a step to dispose an outer end of the sidewall rubber as viewed in a tire-diameter direction, on an imaginary extension line or at a distance that is outside of the imaginary extension line as viewed in a tire-diameter direction, said imaginary extension line extending outwardly toward the sidewall rubber in a tire width direction from a point at a 15% depth of wear limit in a shoulder portion of the tire along the tread surface, as well as at a point that is located outside of the ground contact end of the tread surface as viewed in a width direction of the tire.

2. The method of manufacturing the pneumatic tire according to claim 1, wherein in the second step, the electrically conductive layer is formed by winding a strip of electrically conductive rubber.

3. A pneumatic tire, comprising:
  an electrically non-conductive tread rubber that constitutes an outer periphery portion of a tread;
  an electrically conductive layer that extends continuously along a circumferential direction of the tire while alternately passing through a plurality of first positions that are located on the tread surface inside of a ground contact end of the tread surface as viewed in a width direction of the tire, and a plurality of second positions that are located outside of the ground contact end of the tread surface as viewed in the width direction of the tire and are in contact with a sidewall rubber; and
  the sidewall rubber having an outer end as viewed in a tire-diameter direction, said outer end thereof being disposed on an imaginary extension line or at a distance that is outside of the imaginary extension line as viewed in a tire-diameter direction, said imaginary extension line extending outwardly toward the sidewall rubber in a tire width direction from a point at a 15% depth of wear limit in a shoulder portion of the tire along the tread surface, as well as at a point that is located outside of the ground contact end of the tread surface as viewed in a width direction of the tire.

4. The pneumatic tire according to claim 3, wherein the electrically conductive layer is formed of a strip of electrically conductive rubber.

5. The method of manufacturing the pneumatic tire according to claim 1, wherein in the second step, the electrically conductive layer is formed by winding a strip of electrically conductive rubber in a zigzag pattern.

6. The method of manufacturing the pneumatic tire according to claim 1, wherein in the second step, the electrically conductive layer is formed by winding a strip of electrically conductive rubber in a twice-formed zigzag pattern with one strip pattern overlying, but being out of phase with, the other.

7. The method of manufacturing the pneumatic tire according to claim 1, wherein in the second step, the electrically conductive layer is formed by winding a strip of electrically conductive rubber in a rectangular wave shaped pattern.

8. The method of manufacturing the pneumatic tire according to claim 1, wherein in the second step, the electrically conductive layer is formed by winding a strip of electrically conductive rubber in a spiral shaped pattern.

9. The method of manufacturing the pneumatic tire according to claim 1, wherein in the second step, the electrically conductive layer is formed by winding a strip of electrically conductive rubber in the pattern illustrated by FIG. 9(a) or by FIG. 9(b) or by FIG. 9(c) or by FIG. 9(d) or by FIG. 9(e), which are hereby incorporated herein by reference.

* * * * *